Oct. 31, 1950    L. R. CROUCH    2,528,040
METHOD OF BRAZING AND WELDING
Original Filed June 28, 1937
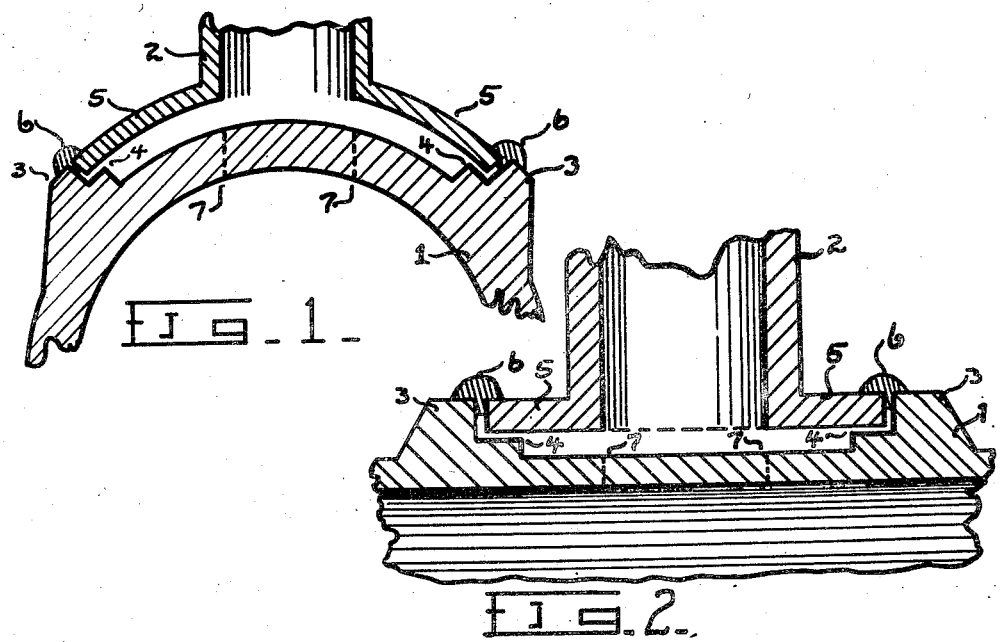
INVENTOR.
Logan R. Crouch
BY J. Lewis Peyton
ATTORNEYS.

UNITED STATES PATENT OFFICE 2,528,040

METHOD OF BRAZING AND WELDING

Logan R. Crouch, Jackson, Miss.

Substituted for abandoned application Serial No. 150,773, June 28, 1937. This application October 28, 1944, Serial No. 560,860

2 Claims. (Cl. 29—148.2)

This invention relates to improvements in structures and methods for autogeneous welding and brazing. The present application is a substitute application for abandoned application Serial No. 150,773, filed June 28, 1937.

Herein I deal with a plurality of improvements which are to be employed in the art of joining members by welding or brazing, and particularly with improvements in the structure of the members which are to be joined by means of which particular problems heretofore known to the art are overcome.

It has long been known that when two members were to be joined, if the weld be laid across one member instead of along its edge severe internal stress might be set up in the member. It has therefore become the practice, where possible, to form the structures to avoid welds which do not follow the edges of the members which are joined together.

The problem of internal stress is much more serious in some cases than others. If the members are fairly light in proportion, and are of such metals as steel or copper the problem is not serious. But if one of the members has quite heavy walls, or is composed of cast iron, the problem of welding the joint is very difficult.

Herein I show one member having a projection adapted to form a raised welding surface to be located at a position other than the edge of the member, in order that when heat from the welding torch is applied this heat will be localized at the raised welding surface and dissipated before it reaches the member proper, thereby avoiding internal stress in the member when a second member is joined to it by the welding process.

It is well known in the art that cast iron pipe sometimes break at the point where a hole has been drilled for the purposes of making a tap, due to the weakening of the pipe wall. In the present invention metal is added to the pipe wall by the projection, and this re-enforces the point where the hole is to be drilled, and therefore, the metal projection fills a two-fold purpose of being a reenforcement and also providing a bonding surface.

Altho I do not limit my invention to use on pipe lines, pipes and containers, it has been found to have particular utility to connect a smaller pipe with a larger pipe or container.

In the drawings—

Figure 1 shows in cross section a nipple joined to the side wall of a pipe, viewed from the end of the pipe.

Figure 2 shows in cross section Figure 1 viewed from the side of the pipe.

Referring now to the drawings in detail, Figures 1 and 2, the numeral 1 designates a pipe or other container to which a smaller pipe or nipple 2 is to be connected. The outer surface of the pipe 1 is provided with the extension 3 which is a raised rim or boss which is preferably circular in form and continuous. The nipple 2 is provided with the flange 5, being so shaped that it will join the inner edge of the boss 3 when placed in position. The lower part of the inner side of the boss 3 is extended inwardly to form the seat 4 for the outer edge of the flange 5.

To join the nipple 2 to the pipe 1 the bond 6 is made where the outer edge of the flange 5 joins the upper and inner edge of the boss 3.

The nipple 2 being joined to the pipe 1 by the bond 6, an opening may be drilled in the pipe 1, as denoted by the broken lines 7—7. In some cases the drilling of an opening in the pipe 1, after making of the bond between the nipple 2 and the pipe 1, is very advantageous, since, if the pipe 1 forms the main of a gas system, the nipple 2 may be joined to the main, without discontinuing the service on the main. The edge of the boss 3 which provided the bonding surface is to be considerably reduced in proportion, to facilitate brazing.

The brazing operation may be performed with the surface of the boss 3 either slightly above or below the upper surface of the flange 5. When the time comes for the connection to be made, if the outer surface of the pipe has become deteriorated by chemical action of the soil so as to render the outer surface at 3 unsuited for the bond, this outer surface 3 may be removed either by filing or grinding.

When the flange 5 is provided for the nipple 2, different sizes of nipples may be used, when the dimension of the circular base 3 is the same, since the outer edge of the flange 5 can be sized to fit the boss 3, regardless of considerable variation in the size of the nipple 2.

So far as known up to the present time, no one has invented a means whereby two pipes or similar objects composed of cast iron or heavy metal, have been able to be joined in satisfactory manner by welding, in the position herein described, for the reasons previously set forth herein. My invention, as herein disclosed, permits this accomplishment for the first time, and is of great value in the art.

It is of course understood that I do not wish to limit myself to members composed of any particular metal, but my improvement is of very great importance where one of the two members to be joined are of cast iron. The uses and advantages of my invention, it is believed, will be appreciated and understood by those skilled in the art when the foregoing description has been read in connection with the accompanying drawings; and while I have here shown and described and pointed out certain novel features of my invention, it is to be understood that various omissions, substitutions and changes in the form and details of my invention and its manner of use may be made by those skilled in the art, and that I do not wish to be restricted to the precise structure disclosed, but hold myself entitled to make such changes therefrom as fairly fall within the scope of what I claim.

What I claim is:

1. The method of bonding a nipple to a pipe which consists of providing the pipe with a continuous circular raised rim or boss, forming a stepped seat along the inner and upper surface of the raised boss, providing the end of the nipple to be bonded with an enlarged base flange, the outer rim of which flange is of a size to fit within the seat and to conform to the seat provided by the raised rim or boss, joining the flange within the seat with a brazing composition.

2. The method of bonding a nipple to a pipe which consists of providing the pipe with a continuous circular raised rim or boss, forming a stepped seat along the inner and upper surface of the raised boss, providing the end of the nipple to be bonded with an enlarged base flange, the outer rim of which flange is of a size to fit within the seat and to conform to the seat provided by the raised rim or boss, joining the flange within the seat with a brazing composition and thereafter drilling a hole through the pipe in alignment with the nipple.

LOGAN R. CROUCH.

REFERENCES CITED

The following references are of record in the file of this patent:

UNITED STATES PATENTS

| Number | Name | Date |
|---|---|---|
| 1,146,664 | Stockstrom | July 13, 1915 |
| 1,324,980 | Poppenhusen et al. | Dec. 16, 1919 |
| 1,680,073 | Taylor | Aug. 7, 1928 |
| 1,856,072 | Gordan | May 3, 1932 |
| 1,883,439 | Adams | Oct. 18, 1932 |
| 2,040,140 | Kidd | May 12, 1936 |
| 2,050,867 | Teare | Aug. 11, 1936 |
| 2,126,519 | Vogel | Aug. 9, 1938 |
| 2,192,904 | Ferris | Mar. 12, 1940 |
| 2,226,496 | Jacocks | Dec. 24, 1940 |
| 2,268,343 | Phillips | Dec. 30, 1941 |
| 2,271,652 | Langvand | Feb. 3, 1942 |
| 2,360,359 | Meyers et al. | Oct. 17, 1944 |
| 2,361,636 | Koppel | Oct. 31, 1944 |